United States Patent

Katta et al.

[11] Patent Number: 6,093,437
[45] Date of Patent: Jul. 25, 2000

[54] TOASTER COOKIES

[75] Inventors: Sarath K. Katta; Sambasiva R. Chigurupati; Wayne R. Moore, all of Omaha, Nebr.

[73] Assignee: ConAgra, Inc., Omaha, Nebr.

[21] Appl. No.: 09/313,794

[22] Filed: May 18, 1999

[51] Int. Cl.⁷ .............................. A21D 8/06; A21D 13/00; A21D 10/00
[52] U.S. Cl. .......................... 426/553; 426/466; 426/504; 426/553
[58] Field of Search ..................................... 426/549, 553, 426/94, 391, 497, 504, 466

[56] References Cited

U.S. PATENT DOCUMENTS

| | | | |
|---|---|---|---|
| 4,624,856 | 11/1986 | Vanderveer et al. | 426/549 |
| 4,761,290 | 8/1988 | Meraj et al. | 426/90 |
| 4,772,478 | 9/1988 | Biegel et al. | 426/241 |
| 4,777,057 | 10/1988 | Sugisawa et al. | 426/412 |
| 4,873,098 | 10/1989 | Banks et al. | 426/94 |
| 4,961,941 | 10/1990 | Cocco et al. | 426/94 |
| 5,079,012 | 1/1992 | Lengerich et al. | 426/72 |
| 5,223,292 | 6/1993 | Thulin | 426/283 |
| 6,030,654 | 2/2000 | Thomas et al. | 426/549 |

*Primary Examiner*—Nina Bhat
*Attorney, Agent, or Firm*—Lathrop & Gage L.C.

[57] ABSTRACT

The present invention relates to a cookie and a method for producing the cookie, wherein the method includes forming a cookie from a high melting-point shortening and par-baking the cookies so that it has a moisture level of greater than 5%. Once the cookie has been formed, it can then be placed in a toaster and heated so that when the cookie is removed from the toaster, it will have characteristics similar to a fresh-baked cookie, including flavor, texture, heat, and aroma, without the cookie burning or resulting in drippings or fat dissipating in the toaster.

22 Claims, No Drawings

TOASTER COOKIES

FIELD OF INVENTION

The present invention relates to a method for forming a cookie which is ideally suited for being heated in a toaster or similar device and the cookie itself. The method is comprised of a number of steps, including using a high melting-point shortening to form the composition from which the cookie is formed and under-baking or par-baking the composition so that a cookie is produced that can be placed in a toaster, with the toasted cookie having characteristics similar to a fresh-baked cookie.

BACKGROUND OF THE INVENTION

It is well-known that there are numerous types of commercial cookies and cookie doughs sold in grocery stores to consumers. In fact, cookies are an incredibly popular grocery store and convenience market item which are readily available in pre-cooked varieties and doughs that can be baked to form cookies. Doughs which can be placed in an oven by a consumer and baked to form a fresh and warm cookie are popular but suffer from a few drawbacks. In particular, formation of cookies from doughs can be comparatively time consuming as it often takes any where from five (5) to fifteen (15) minutes to bake the dough, along with the time necessary to place the dough on the pan. Also, after baking the dough and forming the cookies, the pan or pans on which the cookies were baked must be cleaned. Another problem associated with using a dough to form a cookie is that, normally, numerous cookies must be made instead of just one single cookie, so that as a practical matter, a person is precluded from making just one cookie and will, instead, have to make an entire batch. Once the batch has cooled and possibly been stored for a day or longer, the desired characteristics associated with a fresh-baked cookie are lost.

The advantage of using a dough is that a fresh, hot, aromatic cookie is produced that is very desirable or palatable shortly after baking has been completed. Thus, it is desirable to have a commercial cookie which has characteristics similar to a cookie immediately taken out of an oven or shortly after completion of baking. It is even more desired to have a cookie that has all the advantages of a pre-baked cookie and none of the disadvantages associated with doughs, but which has flavor and sensory characteristics similar to a fresh-baked cookie. Those characteristics include a warm and moist texture, a strong aroma that is pleasing to the senses, and a fresh flavor only attainable, typically, from a cookie which has been immediately taken from an oven. It is believed that such characteristics are currently unattainable with regards to pre-baked cookies.

As mentioned, there are numerous pre-cooked or baked cookies which come in a variety of flavors and are sold by such companies as Keebler®, Archway®, and Pepperidge Farm®, for example. These types of pre-baked cookies are desirable because they require no preparation time, are not messy, and require no effort on the part of the consumer. Another advantage is that the pre-baked cookies are designed to be snacked on or eaten one at time. The drawbacks of pre-baked cookies are numerous. First, they lack the sensory appeal of a fresh-baked cookie, in particular, most pre-baked cookies lack the aroma, texture, and flavor of a fresh-baked cookie. Often, the pre-baked cookies are hard or crunchy which is considered an undesirable characteristic. Also, it is believed that there is a consumer perception that fresh-baked cookies are more desirable and flavorful than pre-baked cookies. Even pre-baked cookies that are soft out of the package do not have an aroma or flavor comparable to a fresh-baked cookie. As such, it is desirable to have a cookie which requires very little time to prepare, which is non-messy, and which has a flavorful, warm, aromatic appeal similar to a fresh-baked cookie. Pre-baked cookies do not appear to satisfy all of these criteria.

Another point is that cookies made from doughs will typically have the desired fresh-baked characteristics only available for a short time. What this means is that after storage for a day, "homemade" cookies made from doughs are generally the same as pre-baked cookies. Because of this, it is desired to obtain the characteristics of a fresh-baked cookie for each individual cookie regardless of when the cookie was initially baked.

It would appear that one way to satisfy the above discussed problems is to simply place a pre-baked cookie in a toaster or similar heating device. Presumably, a pre-baked cookie that is warm and aromatic will then be produced as a result of toasting. This is not what will happen, and often negative results will occur after toasting a pre-baked cookie. As shown in the examples contained herein, often when commercial pre-baked cookies are placed in a toaster so as to warm the cookies to try and simulate the temperature and texture of a fresh-baked cookie, problems result. Among the disadvantages of placing a pre-baked cookie in a toaster is that drippings or constituents of the cookie fall into the toaster so that there is a loss of a portion of the cookie and also, more importantly, the toaster is dirtied. Even more problematic is that the drippings often contain fats which could possibly ignite. Another potential problem is that when such pre-baked cookies are removed from the toaster they will crumble, or fall apart. A different problem is that some pre-baked cookies will burn or blacken when placed in a toaster. For obvious reasons, this is disadvantageous, as consumers do not like burned cookies. Thus, it is desired to have a pre-baked cookie which can be placed in a toaster that will not burn, crumble, or disperse into a toaster or similar device.

It should also be pointed out that fresh baked cookies out of the oven are more flavorful and aromatic than pre-baked cookies, because the flavors and aroma are in the process of being released. This is because the heat used to bake the cookies causes the flavors to separate from the cookie and evaporate or volatize, which in turn contributes to the aromicity of the cookies. This is a highly desired effect. Pre-baked cookies, however, will most likely be unsuited to produce this aromatic effect because the flavors were initially volatized when the cookies were first baked. Also, typically heat is not applied to pre-baked cookies which would cause the flavors to volatize. Thus, it is desired to have a cookie that can be toasted or subjected to a high heat short time method and that will release or volatize flavors when toasted so that a fresh baked cookie is simulated.

It may be assumed that toaster pastries could be found to be similar to the cookies of the present invention. This, however, is not true, as toaster pastries are generally very high in fat content, low in sugars, and have a lower moisture content than a cookie. Also, pastries will have a dry, flaky texture, whereas cookies have a dense, moist texture. Because the overall composition for a toaster pastry is different than a cookie, it is believed that the two finished products are different.

SUMMARY OF THE INVENTION

The present invention relates to a method for producing a cookie that can be placed in a toaster or similar device and toasted or warmed so that the finished cookie has characteristics similar to a fresh-baked cookie, while still maintaining the advantages of a pre-baked cookie. The present invention also relates to the cookie formed by the inventive method. The cookies of the present invention are advantageous because they have characteristics similar to a pre-baked cookie in that they are easily consumed, convenient, and can be eaten one at a time. Further, the cookies have the advantages of a fresh-baked cookie in that when removed from a toaster or similar device, after heating, the cookies will have an aroma, temperature, texture, and flavor similar to a fresh-baked cookie. Thus, the present invention combines the advantages of pre-baked cookies and cookies made from a dough to form a previously unknown cookie.

The method for making the cookies is initiated by combining constituents typically found in a cookie formulation and mixing the constituents for a time or period sufficient to develop the gluten. The gluten must be sufficiently developed to ensure that a suitable firmness in the finished cookie is achieved. It is necessary that the cookie composition that will be baked into a cookie be comprised of a high melting-point shortening or fat. It is also preferred to use a granulated sugar. These two constituents contribute to the prevention of drippings or the loss of material from the cookies when placed in a toaster.

After the constituents are mixed, the cookie composition will be par-baked or under-cooked so that when the cookies are placed in a toaster, the baking will be completed. Specifically, color development will preferably be completed and some moisture loss will likely occur. What this means is that after par-baking, the cookies will generally have more moisture than typical pre-baked cookies, as the present cookies will preferably have from 6% to 30% moisture, whereas, pre-baked cookies typically have 5% or less moisture. Importantly, regardless of the amount of moisture, the water activity of the present cookies will be 0.8 or less. Preferably, the water activity will be 0.7 or less. As such, the cookies must have enough moisture present so that baking can be completed when placed in a toaster or similar high heat short time device, but not so much moisture that the water activity is raised to levels whereby microbial colonization and proliferation can readily occur.

The method will include forming the cookie composition so that the completed cookies will have a particular thickness and firmness. In particular, the composition must be mixed so that the gluten found in the cookie composition will be developed enough to result in a firm cookie. This means that the mixing time should range from between about 2 minutes and about 15 minutes, as this is typically the necessary amount of time to cause development of the gluten. Also, the cookie should have a thickness ranging between 2 mm and 20 mm. The gluten should be sufficiently developed and the cookie should have a thickness such that the cookie will have a firmness, as measured by compression tests, ranging between about 0.5 kg and about 8 kg of force and, more preferably, about 1 kg and about 4 kg of force.

It is preferred if the cookie, after baking, is coated with encapsulated flavors which will be released after toasting or warming the cookie. Encapsulated flavors are advantageous because they enhance the taste of the cookie and because they cause the release of a scent or flavors into the atmosphere after toasting so that the cookie has an aroma similar to a fresh-baked cookie. Any of a variety of flavors may be encapsulated. Preferably, the flavors are encapsulated by a fat.

The present invention is advantageous for a number of reasons, in particular, it allows a consumer to realize the benefits associated with a pre-baked cookie while having the desired taste and flavor characteristics associated with a fresh-baked cookie. The cookie is unique in that it is coated with flavors after baking, has a high moisture content, utilizes a high melting-point shortening, and has a desired firmness and size.

DETAILED DESCRIPTION OF THE INVENTION

The present invention relates to a method for producing a cookie, which can be placed in a toaster or similar high-heat, short-time device so that when the cookie is removed from the toaster, the cookie will have characteristics similar to a fresh-baked cookie. The present invention also relates to the actual cookie. In particular, the toasted cookie will be warm and have a soft texture, while having a strong, noticeable aromicity. The cookie is advantageous because it has the characteristics of a fresh-baked cookie, but can be packaged and sold similar to a pre-baked cookie. Thus, the cookie has the convenience of a pre-baked cookie and the flavor, texture, and aromatic characteristics of a fresh-baked cookie.

The method for forming the cookie is initiated by first forming a cookie composition. The cookie composition will be comprised of at least flour, fat, water, and at least one type of flavor. More preferably, the cookie composition will be additionally comprised of sugar, salt, and sodium bicarbonate. Additional constituents can be included in the cookie composition, such as flavored chips, nuts, preservatives, sweeteners other than sugar, starches and maltodextrins, milk or milk products, egg or egg products, colors, gums, processing aids (emulsifiers and enzymes for example), grains other than flour, fruits, spices, antioxidants, and any of a variety of other constituents typically found in a cookie.

One of the key ingredients in the cookie composition is the fat, which is more preferably a shortening. Low-melting point shortenings and fats can be used in the formation of a cookie, including, oils, liquid shortening, or other types of low-melting point fats or shortenings. Because these fats have a low melting point they tend to readily disperse or drip when heated to a certain temperature. In the present method, a high melting-point shortening is used which has a melting point of greater than 100° Fahrenheit ("F") and a solid fat index of greater than 20 at 50° F. and greater than 2 at 104° F. More preferably, the shortening will have a melting point of greater than 117° F. and a solid fat index of greater than 31 at 50° F. and greater than 12 at 104° F. A high melting-point shortening is important because it will allow the finished cookie to be placed in a toaster or similar heating device without formation of drippings or similar products which could spill into the interior of the toaster thereby dirtying the toaster and creating a fire hazard. Any shortening or similar hard fat can be used in the present invention, so long as the shortening has a high temperature tolerance and does not detract from the flavor of the finished cookie.

It is preferred if the sugar added is granulated, as this type of sugar tends to perform better in high temperature environments. Granulated sugar is likely to result in less spreading and breaking of the cookie. Also, it is preferred if the flour is an all-purpose flour as opposed to a cookie flour. An all-purpose flour is a hard wheat flour and appears to result in less spreading or breaking of a cookie made therefrom and a better toasting of the cookie.

As was mentioned, any of a variety of flavors can be used in the formation of the cookie composition. The flavors added will be dictated by the desired type of finished cookie, with flavors such as chocolate, vanilla, butterscotch, or peanut butter suitable for use. Any of a variety of types of flavors can be used as long as they can be implemented into the cookie composition and later toasted or heated when the finished cookie is placed in a toaster or similar device.

Preferably, the cookie composition will contain an amount of flour equal to 100% by weight of baker's percentage, with baker's percentage referring to the weight of all ingredients as measured on a flour basis. The weight of an ingredient is a percentage of the flour in the cookie composition. All of the following ingredients are added in an amount equal to baker's percentage. The amount of granulated sugar will be equal to between about 0% and about 100%; preferably about 60% by weight of baker's percentage. Shortening will be added in an amount equal to between about 10% and about 60% by weight, and more preferably about 40% by weight. An amount of salt should be added in an amount equal to between about 0.5% and about 5%, and more preferably about 1% by weight. Water should be added in an amount ranging between about 10% and about 60% by weight of baker's percentage, and more preferably in an amount equal to about 30% by weight of baker's percentage. The remaining constituents should be added according to taste and preference, for example, sweeteners such as glucose, fructose, lactose, honey, or fructose syrups, can be added dependent upon the desired sweetness of the cookie and the particular sugar substitutes or sweeteners to be added to the cookie composition. Also, preservatives such as calcium propionate or potassium sorbate can be added to the composition in an amount equal to between about 0% and about 2% by baker's percentage weight, with the addition of these preservatives being optional. The sodium bicarbonate should be added in an amount equal to as much as 2% and more preferably about 1% by weight. Constituents should be mixed like any other cookie recipe. More preferably, the composition should be mixed for at least 2 minutes.

Preferably, the cookie composition should be mixed for a period of time sufficient to develop the gluten found in the composition. Gluten development refers to the formation of protein networks during mixing of a dough. If the gluten development is too low, the baked product will not have enough firmness. Conversely, if the gluten development is too high, the baked product will be tough. In general cookies will have low gluten development due to low moisture, high fat, and low protein quality and quantity. Generally, the composition should be mixed for between 2 minutes and 15 minutes. More preferably, the composition should be mixed for about 3 minutes, with the mixing time dependent in part upon the speed of mixing. It is preferred to mix the composition at a low speed on a standard mixer; however, any speed can be used so long as the gluten is suitably developed.

Once the cookie composition is formed, the composition should be divided into preformed shapes and sizes to be baked. The cookie can have shapes such as round, elliptical, square, rectangular, or any other suitable shape. Any amount of cookie composition can be used to form each individual cookie so long as the resulting cookie will have a width or thickness ranging between 2 millimeters ("mm") and about 20 mm. More preferably, the cookie will have a width ranging between about 5 mm and about 10 mm. The width of the cookies is important because cookies that are too thin will fall apart in the toaster. Cookies that are too thick will not adequately warm. Also, because the cookies are pre-baked, they must be of a width that will allow them to be completely warmed in a toaster or similar device. Additionally, the cookies should have a diameter equal to between 3 cm and 25 cm and, more preferably, equal to between 5 cm and 15 cm.

The thickness and gluten development should result in a cookie that has a particular firmness. The firmness should be such that the cookies will hold their shape while being toasted or warmed. More specifically, the cookies should have a firmness ranging between about 0.5 kg and about 8 kg of force and, more preferably, a firmness equal to between about 1 kg and about 4 kg of force, as measured by a compression test. Note that the compression test presently used is a measure of firmness that determines the amount of force (kg) required to punch a 4 millimeter (mm) diameter probe into a cookie through a distance of 12 mm at a speed of 5 mm per second. An instrument suitable for this test is a TA-TX2 Texture Analyzer manufactured by Texture Technologies Corporation, Scarsdale, N.Y.

The cookies will be baked according to standard procedures used in the industry; however, dependent upon the formulation and the equipment used, the cookies will be baked at various temperatures and times. The cookies will be slightly under-cooked or par-baked so that they will have a higher moisture level than most pre-baked cookies and slightly lighter in color. The cookies are par-baked so that a suitable amount of moisture for toasting will remain and, preferably, so that color development will be completed upon toasting. It is preferred for the cookies to be baked at a temperature and time sufficient so that the cookies have a moisture content greater than 5% and preferably ranging between about 5% and about 30%. More preferably, the cookies will have a moisture content ranging between about 6% and about 12%. Preferably, the par-baked cookie will have at least 2% more moisture than if it was completely baked. Enough moisture should remain so as to allow the cookies, which are par-baked, to complete baking when placed in a toaster. Importantly, the cookies should have a water activity level of less than 0.8 and, more preferably, less than 0.7. Thus, the cookies should not be completely baked but, instead, should be under-baked or par-baked so that when placed in a toaster, baking will be completed. It should be noted that prior to baking the cookies will typically have a moisture content ranging between about 10% and about 30%, and, more preferably, about 15% and about 25%.

Once baked, it is preferred to coat the cookies with encapsulated flavors, as they will contribute to the enhanced aroma and flavor of the cookies after they have been toasted. Preferably, the flavors are encapsulated by a fat, with the fat and flavor mixture easily sprayed or applied to the surface of the cookie. Flavors such as vanilla, butter, chocolate, spice, and fruit, can be encapsulated and applied to the surface so that when heated, the flavors will enhance the taste of the cookie, as well as, volatize off the surface of the cookie, thereby adding to the aroma associated with the toasted cookie. This mimics the aroma of a fresh-baked cookie. Besides fat, starches and gums can be used to coat the flavors that are then used to cover the surface of the cookie. The coated flavors on the surface of the cookie are also important because they impart what is known as a "flavor burst" to the cookie. What this means is that when a consumer bites into or consumes a cookie they get an enhanced amount of flavor or taste. The coating can be added in an amount ranging between about 0.1% and about 10% by weight of the cookie.

The cookies will then be packaged and sold to consumers. Once a consumer purchases the cookies, they should be placed in a toaster or similar device for a period of time equal to at least about 1 minute at a temperature ranging between 240° F. and 320° F. While placement in a toaster is preferred, any device that subjects the cookie to a high temperature for a short time is suitable. It is desired to be able to warm the cookie quickly without burning the cookie.

The following examples are for illustrative purposes only and are not meant to limit the claims in any way.

EXAMPLES

Example 1

A sugar cookie formulation was developed that was designed to produce a shelf-stable cookie that could be reheated in a toaster or similar device. The cookie was comprised of the ingredients listed below:

| Ingredient | Bakers (%) |
| --- | --- |
| Flour | 100 |
| Granulated sugar | 60 |
| Shortening | 40 |
| Water | 38 |
| Salt | 1 |
| Sodium bicarbonate | 1 |

The shortening was a high melting-point shortening having a solid fat index equal to at least 2 at 104° F. The shortening was manufactured by Archer Daniels Midland Corporation, Decatur, Ill. The procedure for making the cookies involved mixing the sugar and the shortening for 3 minutes on low speed followed by adding the flour, the water, and the other ingredients, and mixing for another 3 minutes on low speed. The ingredients were mixed in a Hobart, Model N-50 mixer, Hobart Corporation, Troy, Ohio.

After mixing, the cookie composition was formed into pre-cookies having a thickness equal to about 5 mm in thickness. The pre-cookies were then baked to form a par-baked cookie having a moisture content equal to about 8%. The percent moisture was determined by the American Association of Cereal Chemists Method 44-16. The pre-cookie composition was baked for 10 minutes at 400° F. in an Accubake system manufactured by Whirlpool.

Once the cookies were formed and baking was completed, they were allowed to cool.

To determine whether the cookies were suitable for use in a pop-up toaster, sample cookies were placed in a Kenmore toaster, Model #238.48339, by Sears, Roebuck and Co., Hoffman Estates, Ill. After removal from the toaster, it was observed that the cookies had heated well in the pop-up toaster without sticking, and the cookies desirably browned to have an appearance similar to a freshly-baked cookie. Importantly, the cookies did not burn and no left-over material was observed in the toaster. It was observed that the cookies appeared to be very similar to a fresh-baked cookie.

Example 2

In the present Example, the same formulation and method was followed as in Example 1 except that dextrose was included in the formulation. The dextrose was added to the formulation to impart a brown color to the finished cookie.

| Ingredient | Bakers (%) |
| --- | --- |
| Flour | 100 |
| Granulated sugar | 60 |
| Shortening | 40 |
| Water | 38 |
| Salt | 1 |
| Sodium bicarbonate | 1 |
| Dextrose | 5 |

Like Example 1, it was observed that the cookies reheated well in the pop-up toaster without sticking or falling apart and that the cookies had a desirable color. Also, the cookies were observed to be very similar to fresh-baked cookies.

Example 3

Chocolate cookies were prepared the same as in Example 1, except natural chocolate flavor and cocoa powder were added to the cookie formulation.

| Ingredient | Bakers (%) |
| --- | --- |
| Flour | 100 |
| Qranulated sugar | 60 |
| Shortening | 40 |
| Water | 34 |
| Salt | 1 |
| Sodium bicarbonate | 1 |
| Natural Chocolate Flavor | 4.5 |
| Cocoa Powder | 2.25 |

After baking, the moisture content and water activity of the cookies were measured. The average moisture content of the chocolate cookies was about 8.9% and was determined according to the Method disclosed in Example 1. The water activity average for the cookies was also measured and determined to equal about 0.699. The water activity was measured by Aqualab Model CX2 (Decagon Devices, Inc., Pullman, Wash.).

The cookies of the present Example reheated well in the toaster with good flavor development and without material leaking into or sticking to the toaster. Again, the cookies appeared to mimic a fresh-baked cookie.

Example 4

Butter cookies, comprised of the ingredients listed below, were prepared the same as in Example 1.

| Ingredient | Bakers (%) |
| --- | --- |
| Flour | 100 |
| Granulated sugar | 53 |
| Shortening | 35 |
| Water | 33 |
| Dextrose | 4.4 |
| Butter flavor | 4.4 |
| Salt | 0.9 |
| Sodium bicarbonate | 0.9 |

The butter cookies had an average moisture content of 8.25% and an average water activity of 0.696, both determined the same as disclosed in Example 3. It appeared that the cookie reheated well in the toaster without sticking or falling apart.

Example 5

Mango-flavored cookies, comprised of the ingredients listed below, were prepared the same as in Example 1.

| Ingredient | Bakers (%) |
| --- | --- |
| Flour | 100 |
| Granulated sugar | 60 |
| Shortening | 40 |
| Water | 33 |
| Salt | 1 |
| Sodium bicarbonate | 1 |
| Mango Flavor | 0.75 |
| Yellow Color | 0.25 |

The mango-flavored cookies had an average moisture content of 9.06% and an average water activity of 0.685. The cookies reheated well in the toaster without sticking or falling apart.

Example 6

More butter cookies were prepared similar to the butter cookies of Example 4. Sodium alginate was added to improve the moisture and softness of the cookie.

| Ingredient | Bakers (%) |
| --- | --- |
| Flour | 100 |
| Granulated sugar | 60 |
| Water | 45 |
| Shortening | 20 |
| Dextrose | 5 |
| Butter Flavor | 1 |
| Sodium Alginate | 2.5 |
| Sodium bicarbonate | 1 |
| Salt | 1 |

The cookies of the present Example contained an average moisture content of 10.74 and an average water activity of 0.78. The cookies were observed to be very moist and soft. They also reheated well in the toaster without sticking or falling apart.

Example 7

A group of health cookies were prepared. The cookies formed in this Example contained Sustagrain™ barley flour. This particular barley variety is characterized by a high β-glucan content (15%) compared to many regular barley varieties (about 5% β-glucan). The formulation of the cookie was as follows:

| Ingredient | Bakers (%) |
| --- | --- |
| All Purpose Wheat Flour | 100 |
| Sustagrain ™ Flour | 33 |
| Granulated sugar | 80 |
| Shortening | 53 |
| Water | 49 |
| Butter Flavoronate | 6.7 |
| Vanilla Flavor | 3.3 |
| Salt | 1.3 |
| Sodium bicarbonate | 1.3 |

The cookies made with this formulation had an average moisture level of 7.92 and an average water activity of 0.721. The cookies reheated well in the toaster without sticking or falling apart.

Example 8

Cookies formed according to the present method and cookies that are commercially available were placed in a toaster and the results were observed. This was done to compare the toasting or post-baking characteristics of the cookies. The results were as follows:

Experiment 1

A Pepperidge Farm® Chocolate Chunk cookie having a 1.0 cm width or thickness and a 7.8 cm diameter, was placed in a toaster. The toaster had a temperature setting of 300° F. The cookie was in the toaster for 2 minutes and 10 seconds. The Pepperidge Farm® cookie melted and burned.

Keebler® Sandees Pecan Shortbread cookie, having a 1.2 cm width and a 5.8 cm diameter, was also placed in the toaster. The Keebler® Sandees Pecan Shortbread cookie burned and turned very black.

Experiment 2

Archway® Ginger Snaps cookie, having a 0.9 cm width and a 4.6 cm diameter was placed in a toaster. The toaster had a temperature setting of 300° F. The cookie was in the toaster for 2 minutes and 10 seconds. The Archway® Ginger Snaps cookie turned very soft and had a high degree of burning.

Keebler® Chips Deluxe cookie, having a 1.1 cm width and a 5.8 cm diameter, was also placed in the toaster. The Keebler® Chips Deluxe cookie burned to some extent and had chocolate oozing out and drippings onto the base of the toaster.

Experiment 3

Nabisco® Chips Ahoy cookie, having a 1.1 cm width and a 5.4 cm diameter, was placed in a toaster. The toaster had a temperature setting of 280° F. The cookie was in the toaster for 2 minutes and 10 seconds. The Nabisco® Chips Ahoy cookie burned and turned black.

The butter-flavored toaster cookie of Example 4, having a diameter of 10 cm and width of 1 cm, was also placed in the toaster. The test cookie had good color development and flavor.

Experiment 4

The butter-flavored toaster cookie of Example 4 was placed in a toaster. The toaster had a temperature setting of 280° F. The cookie was in the toaster for 2 minutes and 15 seconds. The toaster cookie had good color development and flavor.

A butter-flavored toaster cookie similar to above, but from a different batch, developed according to the present method was also placed in the toaster. The toaster cookie had good color development and flavor.

Experiment 5

A Nabisco® Oatmeal cookie having a diameter of 7 cm and a width of 0.8 cm was placed in a toaster. The toaster had a temperature setting of 280° F. The cookie was placed in the toaster for 2 minutes and 15 seconds. The Nabisco® Oatmeal cookie burned and turned black.

An Archway® Sugar cookie, having a 1 cm width and a 7.8 cm diameter, was also placed in the toaster. The Archway® Sugar cookie burned and turned black.

Experiment 6

The chocolate toaster cookie of the present invention and Example 3 having an 8.5 cm diameter and 1.2 cm width was placed in a toaster. The toaster had a temperature setting of 240° F. The cookie was in the toaster for 2 minutes and 7 seconds. The test cookie had good color and flavor.

A mango-flavored test cookie of the present invention and Example 5 having an 8.7 cm diameter and 1.1 cm width was also placed in the toaster. The test cookie had good color and flavor.

Experiment 7

An Archway® Oatmeal Raisins cookie, having a 1 cm width and a 7.8 cm diameter, was placed in a toaster. The toaster had a temperature setting of 310° F. The cookie was in the toaster for 2 minutes and 15 seconds. The Archway® Oatmeal Raisins cookie completely melted and fell into the toaster.

A Keebler® Chips Deluxe cookie having a 5.8 cm diameter and 1.1 cm width was also placed in the toaster. The Keebler® Chips Deluxe cookie burned, turned black, and melted Experiment 8

A Keebler® Sandees Pecan Shortbread cookie having a 4.6 cm diameter and 0.9 cm width was placed in a toaster. The toaster had a temperature setting of 250° F. The cookie was in the toaster for 2 minutes and 10 seconds. The Keebler® Sandees Pecan Shortbread cookie burned slightly.

A Nabisco® Chips Ahoy cookie having a 5.4 cm diameter and 1.1 cm width was also placed in the toaster. The Nabisco® Chips Ahoy cookie burned, became soft, but did not fall down.

Experiment 9

A Pepperidge Farm® Chocolate Chunk cookie having a 7.8 cm diameter and 1 cm width was placed in a toaster. The toaster had a temperature setting of 320° F. The cookie was in the toaster for 2 minutes and 10 seconds. The Pepperidge Farm® Chocolate Chunk cookie burned, melted, and fell into the toaster.

An Archway® Gingersnaps cookie was also placed in the toaster. The Archway® Gingersnaps cookie burned and fell into the toaster.

Experiment 10

The butter-flavored toaster cookie of the present invention was placed in a toaster. The toaster had a temperature of 260° F. The cookie was in the toaster for 2 minutes and 15 seconds. The toaster cookie was soft, had good flavor and color development, and did not melt or burn.

Experiment 11

The butter-flavored cookie of the present invention was placed in a toaster. The toaster had a temperature setting of 280° F. The cookie was in the toaster for 2:15 minutes. The test cookie had good flavor and color development, was soft, and did not melt or burn.

It should be noted that the commercial cookies were comprised of the following lists of ingredients:

1. The Archway® Ginger Snap cookies were comprised of: Flour, sugar, molasses, vegetable shortening (partially hydrogenated soy and cottonseed oils), water, corn syrup, baking soda, ginger, mono and diglycerides, salt, soy lecithin, potassium bicarbonate, cinnamon, and caramel color.

2. Pepperidge Farm® Chocolate Chunk was comprised of: Flour, semi-sweet chocolate, vegetable shortening (partially hydrogenated soy and cottonseed oils), butter, raisin parts, sugar, fructose, brown sugar, invert sugar, whole eggs, leavening, natural flavors, salt, caramel color and vanilla extract.

3. Archway® Oatmeal Raisin was comprised of: Flour, sugar, vegetable shortening (partially hydrogenated soy and cottonseed oils), oats, raisins, ground raisins, high fructose corn syrup, water, corn syrup, baking soda, non-fat dry milk, eggs, cinnamon, salt, natural and artificial flavor, rice starch, and caramel color.

4. Keebler® Chips Deluxe was comprised of: Flour, vegetable shortening, sugar, semisweet chocolate, molasses, cocoa, salt, leavening, eggs, natural and artificial flavors, whey, and emulsifiers.

5. Nabisco® Chips Ahoy was comprised of: Flour, semi-sweet chocolate chips, sugar, vegetable shortening, high fructose corn syrup, leavening, salt, whey, natural and artificial flavors, and caramel color.

6. Keebler® Sandees Pecan Shortbread was comprised of: flour, sugar, vegetable shortening, wheat starch, pecans, salt, roasted soybeans, defatted wheat germ, natural and artificial flavor, soy lecithin, and sodium bicarbonate.

Example 9

Three types of cookies were formed and compared to determine whether encapsulated flavors influenced the taste of a cookie. The cookies were formed according to the present method and are as follows:

(1) Control: Butter-flavored toaster cookie of the present invention.

(2) Toaster cookies coated with butter flavor in an oil carrier:

(a) the cookie had 0.7 g butter base 20 (Butterbuds), Racine, Wis., applied to the surface of the cookie (38 g) [1.84% on cookies wt]

(b) the cookie had 1 g butter base 20 (Butterbuds) Racine, Wis., applied to the surface of the cookie (40 g) [2.5% on cookie wt].

The flavors were applied after the cookie was par-baked and cooled.

(3) Toaster cookie with encapsulated flavors:

(a) 0.15 g artificial fat encapsulated butter flavors were applied to the surface of a 45 g cookie (Bush Boake Allen., Inc., Montvale, N.J. [0.33% on cookie wt].

The cookies coated with encapsulated flavors or butter in an oil carrier clearly had a preferred aroma while toasting as compared to the control cookie. Importantly, the encapsulated flavors resulted in a readily noticeable aroma. The control cookie had a negligible aroma. The improved flavor of cookies coated with encapsulated flavors is due to the fact that the heat during toasting melts the fat and releases the flavors.

Example 10

Commercial cookies were analyzed to determine the percent moisture and water activity.

| Sample | % Moisture | Water Activity |
| --- | --- | --- |
| KEEBLER's® Chips Deluxe Cookie | 3.43 | 0.269 |
| PEPPERIDGE FARM'S® Chocolate Chunk Cookie | 3.33 | 0.259 |
| ARCHWAY'S® Gingersnap Cookie | 6.8 | 0.341 |
| NABISCO'S® Chips Ahoy Cookie | 3.9 | 0.299 |
| ARCHWAY'S® Oatmeal Raisin Cookie | 12.59 | 0.588 |
| KEEBLER'S® Sandees Pecan Shortbread Cookie | 4.7 | 0.292 |

As can be seen, only two of these cookies, both made by Archway®, had a moisture level similar to the cookies of the present invention. Note, however, from Example 8 that the Archway® cookies either melted, fell apart, or burned. Although some of the commercial cookies had higher moisture they did not have the right texture and fell off in the toaster during toasting.

Thus, there has been shown and described a novel cookie and a method for producing such cookie which fulfills all of the objects and advantages sought therefor. It will be apparent to those skilled in the art, however, that many changes, variations, modifications, and other uses and applications for the subject methods and compositions are possible, and also changes, variations, modifications, and other uses and applications which do not depart from the spirit and scope of the invention are deemed to be covered by the invention which is limited only by the claims which follow.

What is claimed:

1. A method for forming a cookie wherein said cookie can be later warmed in a toaster or similar device, without causing drippings or ingredients from said cookie to disperse into the toaster and without said cookie burning, wherein said method comprises:

a. forming a cookie composition by mixing cookie composition constituents comprising, flour, sugar, shortening, water, salt, and sodium bicarbonate, with said shortening having a melting point of greater than 100° F. and a solid fat index greater than 20 at 50° F. and greater than 2 at 104° F.; and b. par-baking said cookie composition so as to form said cookie, with said cookie having a moisture content ranging between about 5% and about 30% by weight of said cookie composition and a water activity of less than 0.8.

2. The method of claim 1 wherein said cookie composition is further comprised of an amount of flavoring selected from the group consisting of vanilla, chocolate, butter, banana, mango, strawberry, raspberry, cinnamon, apple, orange, lemon, and ginger.

3. The method of claim 1 wherein said method is comprised of applying a coating to said cookie, with said coating comprised of encapsulated flavors, so that when said cookie is toasted said encapsulated flavors will be released.

4. The method of claim 1 wherein said cookie has a water activity of less than 0.7.

5. The method of claim 1 wherein said cookie has a thickness ranging between about 2 mm and about 20 mm.

6. The method of claim 5 wherein said cookie has a thickness ranging between 5 mm and 10 mm.

7. The method of claim 1 wherein said cookie has a moisture content ranging between about 6% and about 12%.

8. The method of claim 1 wherein said sugar is granulated.

9. The method of claim 1 wherein said cookie has a firmness equal to between about 0.5 kg and about 8 kg of force.

10. The method of claim 1 wherein said flour is all-purpose flour.

11. The method of claim 3 wherein said coating is comprised of a flavor encapsulated by a fat.

12. The method of claim 3 wherein said coating is applied to said cookie's surface, in an amount ranging between about 0.1% and about 10% by weight of said cookie.

13. The method of claim 1 wherein said shortening has a solid fat index greater than 31 at 50° F. and greater than 12 at 104° F.

14. The method of claim 1 wherein said method includes warming said cookie at a temperature of at least 240° F. for at least 1 minutes.

15. A cookie which can be warmed in a toaster or similar device without drippings or similar ingredients to disperse into the toaster or similar device, wherein said cookie is comprised of flour, sugar, shortening, water, salt, and sodium bicarbonate, with said shortening having a melting point greater than 117° F. and a solid fat index of greater than 20 at 50° F. and greater than 2 at 104° F., said cookie having a water activity of less than 0.8 and a moisture content ranging between about 6% and about 12% by weight of said cookie.

16. The cookie of claim 15 wherein said cookie is comprised of a coating, with said coating comprised of an encapsulated flavor.

17. The cookie of claim 15 wherein said cookie has a firmness equal to between about 0.5 kg and about 8 kg of force.

18. The cookie of claim 15 wherein said cookie has a thickness ranging between about 2 mm and 20 mm.

19. The method of claim 15 wherein said flour is all-purpose flour.

20. The method of claim 15 wherein said cookie has a diameter equal to between about 3 cm and about 25 cm.

21. The method of claim 20 wherein said cookie has a diameter equal to between about 5 cm and about 15 cm.

22. A method for heating a cookie at a high temperature for a short period of time, without said cookie burning, melting, or having constituents which comprise said cookie dripping or dissipating into a device which is designed for high temperature, short-time heating, wherein said method comprises:

a. forming a cookie composition by mixing cookie composition constituents comprising, flour, sugar, shortening, water, salt, and sodium bicarbonate, with said shortening having a melting point of greater than 100° F. and a solid fat index greater than 20 at 50° F. and greater than 2, at 104° F.; and b. par-baking said cookie composition so as to form said cookie, with said cookie having a moisture content ranging between about greater than 5% and about 30% by weight of said cookie composition and a water activity of less than 0.8; and, c. placing said cookie in a high temperature, short-time device for a period of time sufficient to heat said cookie.

* * * * *

UNITED STATES PATENT AND TRADEMARK OFFICE
CERTIFICATE OF CORRECTION

Patent Number: 6,093,437
Date of Patent: July 25, 2000
Inventor(s): Sarath K. Katta; Sambasiva R. Chigurupati; and Wayne R. Moore It is certified that an error appears in the above-identified patent and that said Letters Patent is hereby corrected as shown below:

In column 8, line 22, change

"Qranulated sugar" to

"--Granulated-- sugar"

Signed and Sealed this

Seventeenth Day of April, 2001

*Attest:*

NICHOLAS P. GODICI

*Attesting Officer*     *Acting Director of the United States Patent and Trademark Office*